Patented Aug. 10, 1937

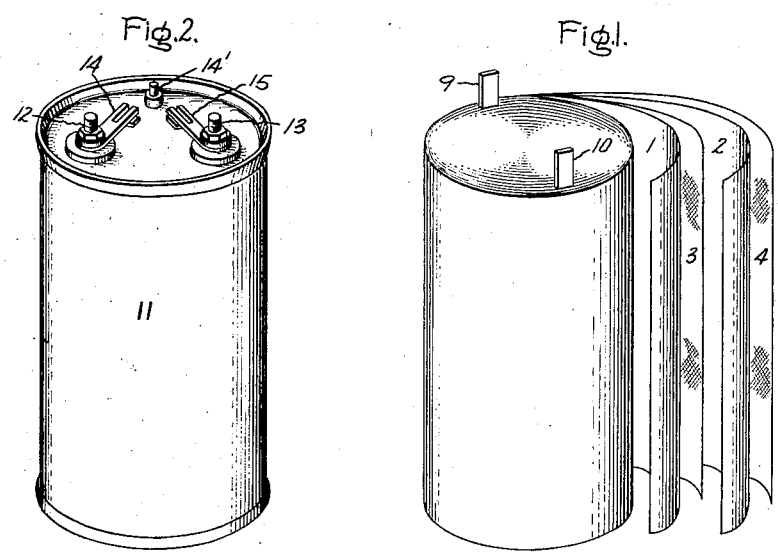
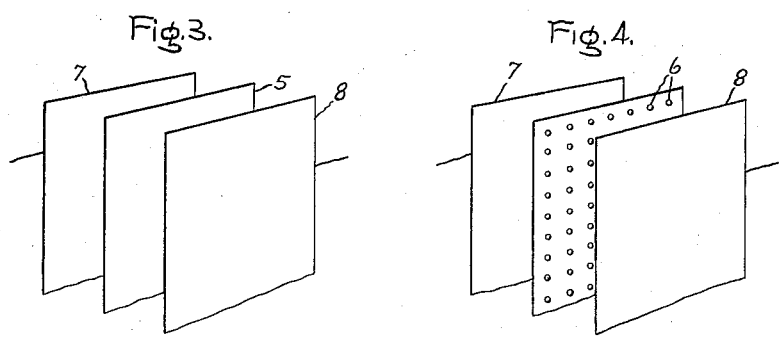

2,089,684

UNITED STATES PATENT OFFICE 2,089,684

ELECTRIC CAPACITOR

Frank M. Clark and Ralph A. Ruscetta, Pittsfield, Mass., assignors to General Electric Company, a corporation of New York Application November 30, 1934, Serial No. 755,426

7 Claims. (Cl. 175—315)

The present invention is concerned with electrical capacitors or condensers and its object is to improve the operating efficiency and reliability of such devices.

It has been suggested heretofore to employ in electrolytic condensers, rectifiers and the like, dilute solutions of organic acid associated with a salt. The employment of concentrated acid in electrolytic capacitors, which is a novel feature of our invention, has marked advantages over dilute acid solutions. Our invention involves in particular the employment of such an acid in thin films, as for example, for filling voids in a thin layer of porous spacer between the capacitor armatures. In accordance with a further feature of our invention, the acid may contain a thickening agent, such as a cellulose compound.

In the accompanying drawing, Fig. 1 shows a rolled type of capacitor embodying the present invention; Fig. 2 is a perspective of a completed capacitor; and Figs. 3 and 4 are diagrammatic representations of stacked capacitors.

While our invention has been described with particular reference to an impregnating mixture containing acetic acid, various other water-soluble organic acids may be used. Propionic acid and butyric acid are examples of other aliphatic acids; cresylic acid (cresol) and carbolic acid (phenol) are examples of suitable aromatic or cyclic type acids. All such acids have an electrical resistivity less than $1 \times 10^7$ ohms per centimeter cubed at 25° C.

Referring to the drawing, the capacitor illustrated by Fig. 1 comprises armatures, or electrodes 1, 2 of suitable metal, for example, aluminum, tantalum, or magnesium. The capacitor armatures ordinarily consist of aluminum foil having a thickness of about .001 to .003 inch. Between them are located porous spacers, 3, 4, of imbibitory material, such for example, as cheesecloth or porous paper, which is impregnated or filled with the acid during the fabrication of the capacitor. In the drawing two spacers have been shown, the capacitor of Fig. 1 being of the rolled type and it is of course desired that the spacer should be present in all cases between adjacent windings of the wound up strip armatures.

The cheesecloth, which is our preferred form of spacer, should be free from chlorides, and may have a thickness between the limits of about .0025 and .0055 inch, although this thickness is not critical. The thread count can be varied over a wide range. We have found cheesecloth having a thread count of 40 x 44 to be satisfactory. A paper spacer having a porosity similar to that of blotting paper may be used as shown at 5, Fig. 3. The thickness of the paper may be between .0004 and .001 inch. The spacer may be perforated, that is, provided with closely placed holes, as indicated at 6, Fig. 4. It has been determined that paper containing one mm. diameter perforations spaced 1 to 2 mm. apart is satisfactory. A spacer is not an essential part of the present invention and may be omitted. Its use, however, is recommended.

Before the electrodes are assembled, a film of oxide may and preferably should be produced thereon, preferably by electrolytic treatment in accordance with well understood practice. While the electrodes commonly consist of lengths of thin aluminum foil, plates 7, 8 may be used as indicated in Figs. 3 and 4. These plates may be flat, corrugated, or have other suitable configuration.

A suitable electrolyte for the preliminary electrolytic oxidation treatment of the film-forming electrode or electrodes may be made by dissolving 80 parts of boric acid and 2 parts of borax by weight in 1000 parts of distilled water. However, these constituents may be varied considerably without seriously affecting the results. The oxidation treatment can be carried out entirely in one container or the electrode material when consisting of long strips of foil can be traversed successively through a series of electrolytic baths in different containers, the baths increasing in concentration as the foil progresses from the first to the last bath.

Preferably the voltage at which the electrolytic treatment is carried out should be equal to or not more than about ten per cent greater than the voltage at which the completed capacitor is intended to be operated. For capacitors desired for alternating current operation the treatment of the film-forming electrodes may be carried out either with alternating or direct current. If direct current is used, the voltage employed should be equal to or slightly exceeding the peak of the alternating current voltage at which the capacitors are intended to be operated.

The electrolyte may be heated during the forming process, a temperature of about 90 to 95° C. being suitable. Aluminum foil intended for operation in the completed capacitor with 110 volt alternating current may be oxidized by direct current treatment, the foil being made the anode and a voltage of 160 volts being applied between anode and cathode. The rate of the passage of the foil through the electrolyte and the amount of current depends upon the conditions as well understood. Ordinarily a foil, when the oxidizing treatment has been completed, should not pass more than one ampere per square foot at 160 volts, direct current, while immersed in electrolyte as above described and at a temperature of 95° C. After the foil has been oxidized, it may be dried and stored in a dry environment until it is desired for use.

The capacitors are assembled in accordance with well understood practice; for example, by rolling (Fig. 1), or stacking (Figs. 3 and 4), the oxidized foil and the spacer in proper relation. While it is necessary in capacitors intended for alternating current use to have both armatures filmed or oxidized, it is sufficient when the capacitors are intended for direct current use to have but one foil or armature (the anode) provided with an oxide film. The cathode need not be oxidized and in fact may consist of any metal which is inert with respect to the electrolyte. Electrical connections are made to the respective armatures in accordance with well understood practice as by folding back one end of each foil and attaching to it straps 9, 10 of desired width, for example, about one-half inch, to make electrical connection to exterior terminals.

When acetic acid is the impregnating material, it may be used in the anhydrous state (glacial acetic acid) or it may be associated with a small amount of water, preferably not exceeding 15% by weight. An application, Serial No. 755,428 of Frank M. Clark, filed November 30, 1934, which is assigned to the same assignee as the present application, describes and claims electric capacitors containing an organic acid, and in particular, acetic acid, such acid being associated with water in amounts up to about 15 per cent.

When anhydrous impregnating material is desired, a hydrous acid may be heated to about 100° C. while stirring to drive off water. Ordinarily heating from 100 to 110° C. for at least fifteen minutes will produce an anhydrous condition.

When the condenser assembly is to be impregnated the condenser assembly including the porous spacer is immersed in the acid while the latter is heated to about 75 to 100° C. After about one hour immersion in the impregnating liquid at this temperature, the capacitor is subjected for about one hour at the same temperature while in the liquid to intermittently or continuously applied voltage. The voltage may be applied for about five seconds and then discontinued for about five seconds. The object of this treatment is to "cure" any defective or unoxidized spots on the aluminum as may occur occasionally at edges or elsewhere. It is desirable that this curing treatment be carried out at a temperature at least about as high as 60 to 75° C. While alternating current application of voltage is preferred at this stage, direct current application may be used. For example, in the case of a condenser to be operated at 110 volts alternating current, the curing treatment may be carried out at 160 volts direct current. When employing direct current it is necessary to reverse the polarity at regular intervals, say once each twenty seconds. When alternating current application is employed, then the curing treatment may be carried out at the voltage at which the capacitor is intended to be operated.

After the capacitor has been impregnated it is cooled to room temperature while still being immersed in the acid impregnant. When the impregnation has been completed each capacitor assembly has its voids filled with the acid impregnant.

After having been cooled the capacitors are sealed in a container 11, preferably consisting of aluminum. This may be accomplished by crimping on an aluminum top provided with contacts 12 and 13 and a breather vent 14' to avoid excess internal pressure. The treated condenser assembly may be totally surrounded in its container by wax which preferably should have a melting point between about 75 to 100° C. In this case a second topping layer of sealing compound may be applied consisting for example of a high melting asphalt. External terminals 14 and 15 are provided as usual.

In accordance with an alternative method of sealing the capacitor elements, after impregnation and voltage treatment, they are removed at approximately 50° C. and dipped into a wax or compound which melts at a temperature approximating 75 to 100° C. By this treatment the capacitor assembly is encased in wax or compound. The assembly so encased then may be put either singly or in groups into a container which is finally filled with the same wax or compound and if desired given a final high melting top seal.

Capacitors prepared in accordance with my invention, using preferably acetic acid, possess both high capacity and low power factor. The capacity of such capacitors or condensers is higher than that of present commercial forms of electrolytic capacitors. For example, at 110 volt alternating current service ordinary electrolytic capacitors require about 8½ to 9 square inches of armature surface for one microfarad capacity, whereas the herein described capacitors require from 7 to 7½ square inches of armature surface of one microfarad capacity. The power factor of the acetic acid capacitor at room temperature is as low as 3 to 5% for 110 volt service or even lower. No discontinuity in electrical characteristics is observed over a wide range of temperature even if the range of temperature should include the freezing point of the organic acid employed in such capacitors. For example, the freezing point of acetic acid is 17° C. and both the power factor and capacity show only a very slight temperature variation over a range of minus 40° C. to plus 100° C.

In some cases it is desirable to add a thickening agent to increase the viscosity of the acid. A cellulose derivative such as a cellulose ester (for example, the acetate or nitrate), or a cellulose ether (for example, ethyl, methyl or benzyl cellulose) may be dissolved or colloidally dispersed in the acid. The presence of a cellulose compound does not adversely affect the electrical characteristics of the acid. The viscosity of acetic acid (which is 35 seconds at 37.8° C.) is increased by cellulose acetate as indicated by the following examples:

| Percent acetate by weight | Viscosity at 37.8° C. |
|---|---|
| | Seconds |
| Three | 37 |
| Five | 114 |
| Ten | 1283 |

Ten percent of thickening agent ordinarily is preferred.

In some cases a salt in finely divided state also may be present as described and claimed in copending application Serial No. 755,425, filed Nov. 30, 1934. As therein described, various salts (preferably such as are soluble in acetic or other acid impregnant) to advantage may be added to the impregnating liquid. The following salts may be used: ammonium acid borate, sodium borate, sodium potassium tartrate (Rochelle salt), ammonium phosphate, sodium acetate, and ammonium acetate.

While our invention has been illustrated by reference to acetic acid, it is not to be so limited. As above indicated, various liquid organic acids of either the aliphatic or cyclic series may be used. As aliphatic acid examples, the following are given: propionic, butyric, isobutyric, valeric, isovaleric, diethylacetic, acrylic, crotonic, lactic, dihydroxy-propionic, hydroxyacrylic, and ethylene lactic acid. As illustrative of the aromatic acids, carbolic acid and cresylic acid have been noted above. Such acids all possess a substantial degree of water solubility.

What we claim as new and desire to secure by Letters Patent of the United States is:

1. An electric capacitor comprising the combination of film-forming capacitor armatures and an organic acid filling voids between said armatures, said acid having electrical resistivity less than $1 \times 10^7$ ohms per centimeter cubed at 25° C.

2. An electric capacitor comprising the combination of film-forming capacitor armatures, a porous spacer therebetween and substantially water-soluble organic acid filling voids in said spacer.

3. An electric capacitor comprising the combination of film-forming capacitor armatures, a porous spacer therebetween, and substantially anhydrous acetic acid filling voids in said spacer.

4. An electric capacitor comprising the combination of film-forming capacitor armatures, a porous spacer therebetween, and acetic acid which contains about 3 to 10 per cent by weight of dissolved cellulose acetate filling voids in said spacer.

5. An electric capacitor comprising the combination of film-forming capacitor armatures, a porous spacer therebetween and a composition permeating said spacer comprising water-soluble organic acid containing no more than about 15 per cent water and suspended and dissolved salts thickened with a colloidally suspended cellulose acetate.

6. An electric capacitor comprising the combination of film-forming armatures, a porous spacer therebetween and an electrolyte comprising crotonic acid as an essential ingredient filling voids in said spacer.

7. An electric capacitor comprising the combination of film-forming armatures, a porous spacer therebetween and a void-filling material in said spacer, such material consisting of substantially water-soluble organic acid selected from the group consisting of acetic, propionic, butyric, isobutyric, valeric, isovaleric, diethylacetic, acrylic, crotonic, lactic, dihydroxy-propionic, hydroxyacrylic, and ethylene lactic acid.

FRANK M. CLARK.
RALPH A. RUSCETTA.